(12) United States Patent
Chan et al.

(10) Patent No.: US 9,886,637 B1
(45) Date of Patent: Feb. 6, 2018

(54) APPARATUSES, SYSTEMS AND METHODS FOR ACQUIRING IMAGES OF OCCUPANTS INSIDE A VEHICLE

(71) Applicant: STATE FARM MUTUAL AUTOMOBILE INSURANCE COMPANY, Bloomington, IL (US)

(72) Inventors: Aaron Scott Chan, Lisle, IL (US); Kenneth Jason Sanchez, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 73 days.

(21) Appl. No.: 14/994,299

(22) Filed: Jan. 13, 2016

Related U.S. Application Data

(60) Provisional application No. 62/102,672, filed on Jan. 13, 2015.

(51) Int. Cl.
| | |
|---|---|
| *G06K 9/00* | (2006.01) |
| *B60R 1/00* | (2006.01) |
| *H04N 5/225* | (2006.01) |
| *G06T 7/00* | (2017.01) |
| *G06K 9/62* | (2006.01) |
| *G06K 9/46* | (2006.01) |

(52) U.S. Cl.
CPC ............ *G06K 9/00832* (2013.01); *B60R 1/00* (2013.01); *G06K 9/46* (2013.01); *G06K 9/6201* (2013.01); *G06T 7/0042* (2013.01); *H04N 5/2258* (2013.01); *B60R 2300/8006* (2013.01); *G06T 2207/30196* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 8,527,146 B1 * | 9/2013 | Jackson | B60W 50/0098 180/273 |
| 2007/0120697 A1 * | 5/2007 | Ayoub | B60K 35/00 340/686.1 |
| 2015/0077237 A1 * | 3/2015 | Chou | G06F 3/0483 340/439 |
| 2016/0046261 A1 * | 2/2016 | Gulash | B60R 22/48 701/23 |

\* cited by examiner

*Primary Examiner* — Delomia L Gilliard
(74) *Attorney, Agent, or Firm* — Marshall, Gerstein & Borun LLP; Randall G. Rueth

(57) ABSTRACT

The present disclosure is directed to apparatuses, systems and methods for acquiring images of occupants inside a vehicle. More particularly, the present disclosure is directed to apparatuses, systems and methods for acquiring images of occupants inside a vehicle using a vehicle in-cabin device that automatically determines a location of the device inside the vehicle.

20 Claims, 6 Drawing Sheets

US 9,886,637 B1

APPARATUSES, SYSTEMS AND METHODS FOR ACQUIRING IMAGES OF OCCUPANTS INSIDE A VEHICLE

CROSS REFERENCE TO RELATED APPLICATION

The present application claims benefit of priority, under 35 U.S.C. § 119(b), to U.S. Provisional Patent Application Ser. No. 62/102,672, entitled METHODS AND SYSTEMS FOR GENERATING DATA REPRESENTATIVE OF VEHICLE IN-CABIN INSURANCE RISK EVALUATIONS, filed Jan. 13, 2015, the disclosure of which is incorporated herein in its entirety by reference.

TECHNICAL FIELD

The present disclosure is directed to apparatuses, systems and methods for acquiring images of occupants inside a vehicle. More particularly, the present disclosure is directed to apparatuses, systems and methods for acquiring images of occupants inside a vehicle using a vehicle in-cabin device that automatically determines a location of the device inside the vehicle.

BACKGROUND

Vehicles are being provided with more complex systems. For example, vehicles commonly include a plethora of entertainment systems, such as stereos, USB interfaces for mobile telephones, video players, etc. Vehicles often have a host of other operator interfaces, such as emergency calling systems, vehicle navigation systems, heating and air conditioning systems, interior and exterior lighting controls, air bags, seatbelts, etc.

Vehicle operating environments are becoming more complex as well. For example, some roadways include u-turn lanes, round-a-bouts, no-left turn, multiple lanes one way in the morning and the other way in the afternoon, etc. Increases in traffic are also contributing to increased complexity.

These additional complexities contribute to increases in driver distractions. A great deal of innovation is taking place related to vehicle in-cabin devices for identifying driver distractions, and for reducing driver distractions.

What is needed are apparatuses, systems, and methods for automatically determining a vehicle in-cabin device location. What is further needed are methods and systems for generating data representative of vehicle in-cabin insurance risk evaluations based on data representative of skeletal diagrams of a driver that are indicative of driver distractions.

SUMMARY

A vehicle in-cabin device for generating data representative of at least one skeletal diagram of at least one occupant within an associated vehicle may include a processor and a memory. The vehicle in-cabin device may further include at least one sensor for generating vehicle interior data, wherein the vehicle interior data is representative of a location of the vehicle in-cabin device within the vehicle. The vehicle in-cabin device may also include a vehicle in-cabin device location determination module stored on the memory that, when executed by the processor, causes the processor to generate vehicle in-cabin device location data based on the vehicle interior data, wherein the vehicle in-cabin device location data is representative of a location and orientation of the vehicle in-cabin device within the vehicle interior.

In another embodiment, a computer-implemented method for automatically registering a location of a vehicle in-cabin device within an interior of a vehicle may include positioning the vehicle in-cabin device within the interior of the vehicle. The method receiving, at a processor of a computing device, vehicle in-cabin device registration location data from a sensor of the vehicle in-cabin device, wherein the vehicle in-cabin device registration location data is representative of at least one of: a two-dimensional location of the vehicle in-cabin device within the vehicle or a three-dimensional location of the vehicle in-cabin device within the vehicle and at least one of: a vehicle in-cabin device tilt value, a vehicle in-cabin device pan value, or a vehicle in-cabin device roll value. The method may also storing the vehicle in-cabin device registration location data within a memory.

In a further embodiment, a non-transitory computer-readable medium storing computer-readable instruction that, when executed by a processor, may cause the processor to automatically register a location of a vehicle in-cabin device within an interior of a vehicle. The non-transitory computer-readable medium may also include a vehicle in-cabin device registration location data receiving module that, when executed by the processor, causes the processor to receive vehicle in-cabin device registration location data from a sensor of the vehicle in-cabin device, wherein the vehicle in-cabin device registration location data is representative of at least one of: a two-dimensional location of the vehicle in-cabin device within the vehicle or a three-dimensional location of the vehicle in-cabin device within the vehicle and at least one of: a vehicle in-cabin device tilt value, a vehicle in-cabin device pan value, or a vehicle in-cabin device roll value. The non-transitory computer-readable medium may further include storing the vehicle in-cabin device registration location data within a memory.

DETAIL DESCRIPTION

Figure 1A:
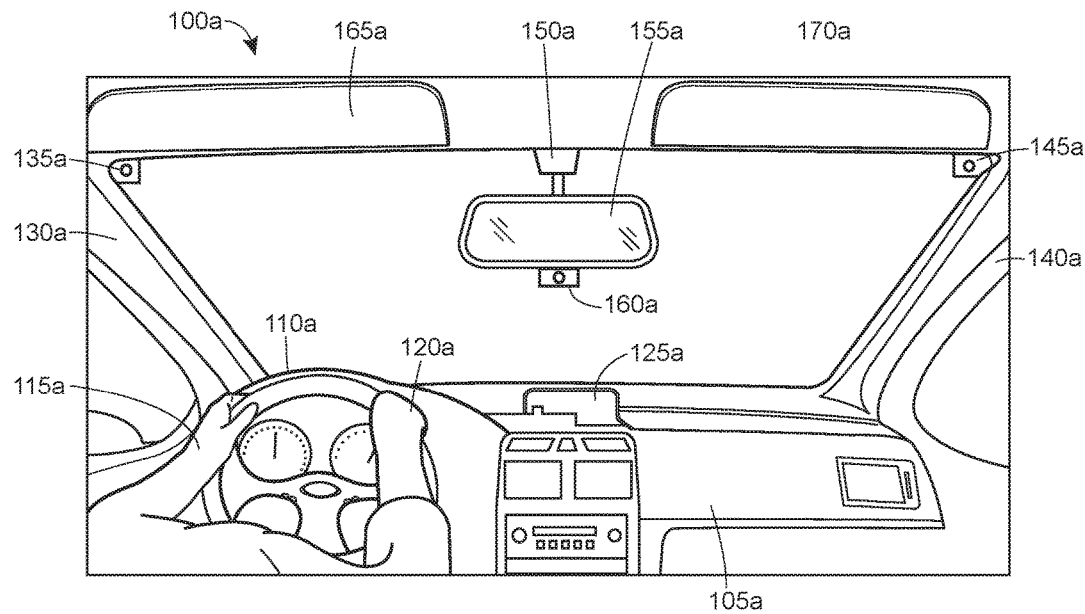
FIGS. 1A-1C depict various views of the interior of an example vehicle that illustrate locations of vehicle operator monitoring devices within the vehicle.

Apparatuses, systems and methods for acquiring images of occupants inside a vehicle may include using a vehicle in-cabin device that automatically determines a location of the device inside the vehicle. For example, a vehicle in-cabin device may be provided to an insured individual, and the insured individual may place the vehicle in-cabin device within an interior of an associated vehicle. As described herein, the vehicle in-cabin device may automatically determine an associated location and/or orientation of the vehicle in-cabin device. Thereby, an insured individual may select a location for the vehicle in-cabin device, and may not require assistance from an installer. Thus, an associated insurance provider may provide a vehicle in-cabin device directly to an insured individual without enlisting any third-party.

A vehicle in-cabin device may include features (e.g., a processor, a memory and sensors) that are configured to automatically determine an associated location and/or orientation. For example, a memory may include computer-readable instructions stored thereon that, when executed by a processor, cause the processor to automatically receive inputs from various sensors, and determine a location and/or orientation of the vehicle in-cabin device free of any calibration by, for example, an insured individual or an installation technician. Thereby, vehicle in-cabin device installation time and cost are reduced relative to, for example, a device that requires an installation technician and/or user calibration. Accordingly, associated memory, processing, and related data transmission requirements are reduced compared to previous approaches.

Based on the determined location and/or orientation, a processor, executing an adjustment algorithm, may adjust associated image such that real-time image data may be correlated with previously classified image data. As a particular example, a vehicle in-cabin device may be located and oriented such that an associated sensor is 2 cm towards a driver from a passenger-side A-pillar, 5 cm above a dashboard, and upside down (i.e., 180 degree rotation about the Z-axis). Thereby, the apparatuses, systems and methods of the present disclosure may adjust current image data right-side up and may compare the adjusted image data to previously classified image data.

Related methods and systems for generating data representative of vehicle in-cabin insurance risk evaluations may include, for example, the following capabilities: 1) determine whether a vehicle driver is looking at a road (i.e., tracking the driver's face/eyes, with emphasis on differentiating between similar actions, such as a driver who is adjusting a radio while looking at the road versus adjusting the radio while not looking at the road at all); 2) determine whether a driver's hands are empty (e.g., including determining an approximate size/shape of an object in a driver's hands to, for example, differentiate between a cell phone and a large cup, for example); 3) identify a finite number of vehicle occupant postures; and 4) vehicle occupant postures, that are logged, may be rotated and scaled to be normalized for a range of different drivers.

An associated mobile application may accommodate all computer system platforms, such as, iOS, Android and Windows, to connect a vehicle in-cabin device to, for example, a cell phone. In addition, to act as data connection provider to remote servers, the mobile application may provide a user friendly interface for reporting and troubleshooting vehicle in-cabin device operation.

Figure 1B:
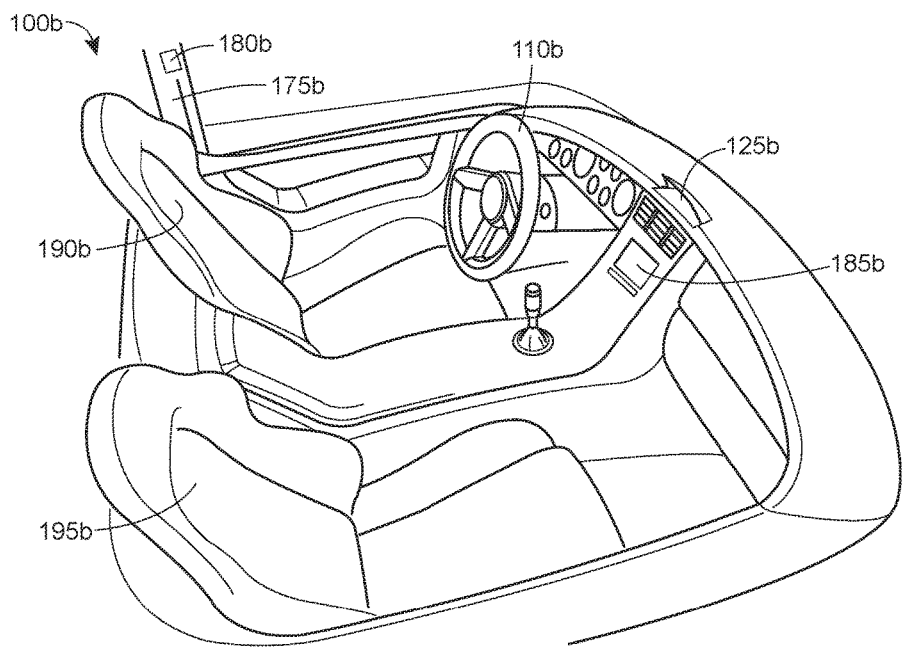
Figure 1C:
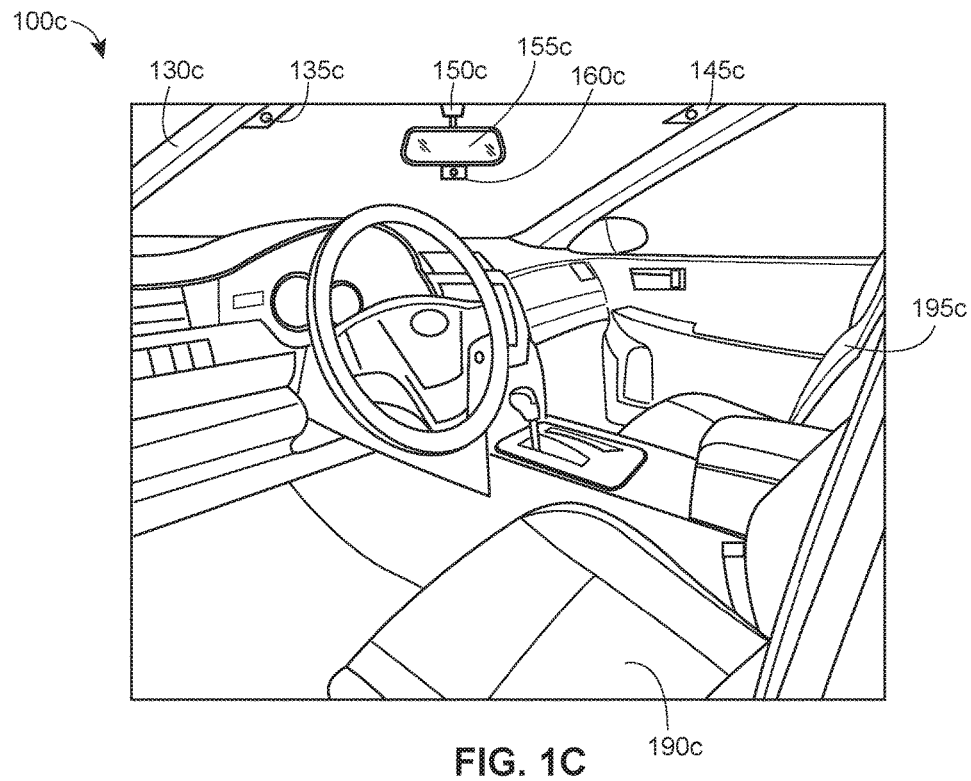

Turning to FIGS. 1A-1C, vehicle interior monitoring systems 100a, 100b, 100c are illustrated. As depicted in FIG. 1A, the vehicle interior monitoring system 100a may include a center-dash vehicle in-cabin device position 125a located in a center area of a dash, a driver-side A-pillar vehicle in-cabin device position 135a located in a driver side A-pillar 130a, a passenger-side A-pillar vehicle in-cabin device position 145a located in a passenger-side A-pillar 140a and a rearview mirror vehicle in-cabin device position 160a located on a bottom-side of the rearview mirror 155a. The vehicle interior monitoring system 100a may further, or alternatively, include vehicle in-cabin device positions in a driver-side visor 165a, a passenger-side visor 170a, a rearview mirror mounting bracket 150a and, or the steering wheel 110a. As described in detail herein, a position of a left-hand 115a of a vehicle driver and, or a position of a right-hand 120a of the vehicle driver, relative to, for example, a vehicle steering wheel 110a may be determined based on data acquired from any one of the vehicle in-cabin device positions 125a, 135a, 145a, 160a. Any one of the vehicle in-cabin device positions 125a, 135a, 145a, 160a may be automatically determined based on, for example, an input from an image sensor, an infrared sensor, an ultrasonic sensor, a compass sensor, a GPS sensor, a microphone or any other suitable sensor.

With reference to FIG. 1B, the vehicle monitoring system 100b may include a driver-side B-pillar vehicle in-cabin device position 180b located in a driver-side B-pillar 175b and a center-dash vehicle in-cabin device position 125b located in a center area of the dash. While not shown in FIG. 1B, the vehicle monitoring system 100b may include a passenger-side B-pillar vehicle in-cabin device position and, or any other vehicle in-cabin device position as described in conjunction with FIG. 1A. The vehicle monitoring system 100b may further include a display device 185b. The display device 185b may be located in, for example, a vehicle in-cabin device located in a center-console area. As illustrated in FIG. 1B, data acquired from the vehicle in-cabin device 125b, 180b may be used to automatically determine a location of the vehicle in-cabin device, a position of a driver-side seat 190b, a passenger-side seat 195b, a steering wheel 110b and, or at least a portion of a vehicle driver (not shown in FIG. 1B).

Turning to FIG. 1C, the vehicle interior monitoring system 100c may include a driver-side A-pillar vehicle in-cabin device position 135c located in a driver side A-pillar 130c, a passenger-side A-pillar vehicle in-cabin device position 145c located in a passenger-side A-pillar 140c and a rearview mirror vehicle in-cabin device position 160c located on a bottom-side of the rearview mirror 155c. The vehicle interior monitoring system 100c may further, or alternatively, include vehicle in-cabin device positions in a rearview mirror mounting bracket 150c and, or the steering wheel 110c. While not shown in FIG. 1C, the vehicle monitoring system 100c may include any other vehicle in-cabin device positions as described in conjunction with FIGS. 1A and 1B. As illustrated in FIG. 1C, data acquired from the vehicle in-cabin device position 135c, 145c may be used to automatically determine a location of the vehicle in-cabin device, a driver-side seat 190c, a passenger-side seat 195c, a steering wheel 110c and, or at least a portion of a vehicle driver (not shown in FIG. 1C).

Figure 2A:
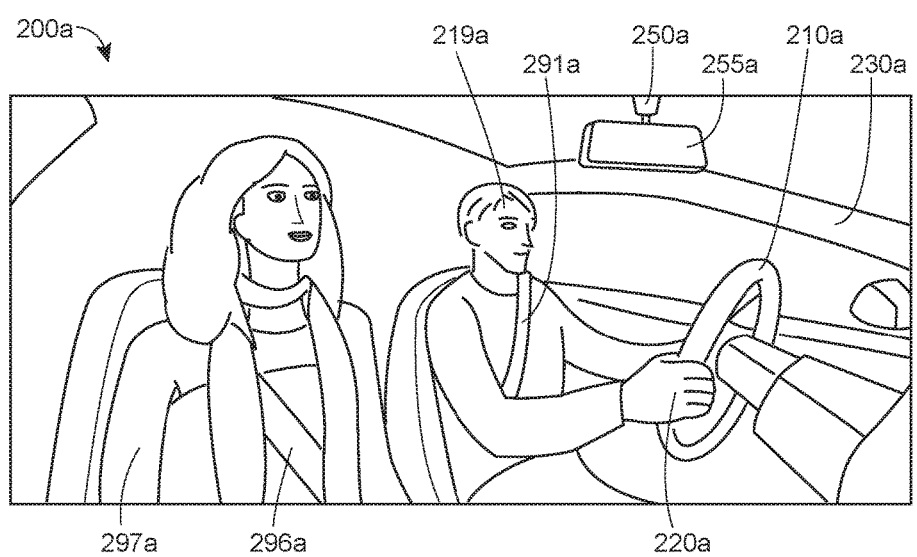
FIGS. 2A-2C illustrate various example images constructed from data retrieved from the vehicle monitoring devices of FIGS. 1A-1C.
Figure 2B:
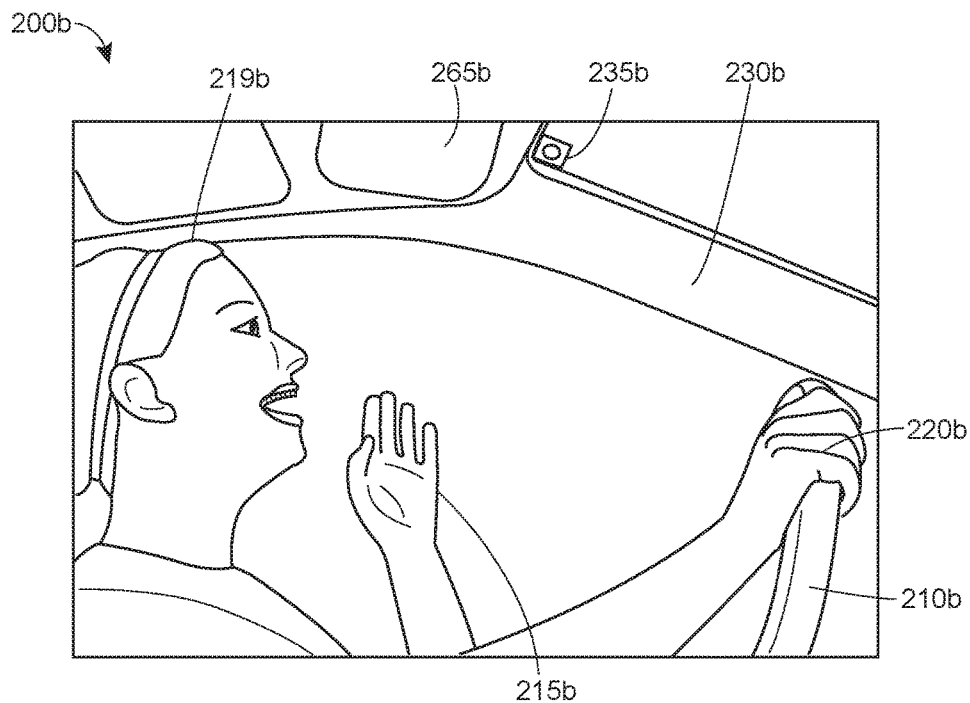
Figure 2C:
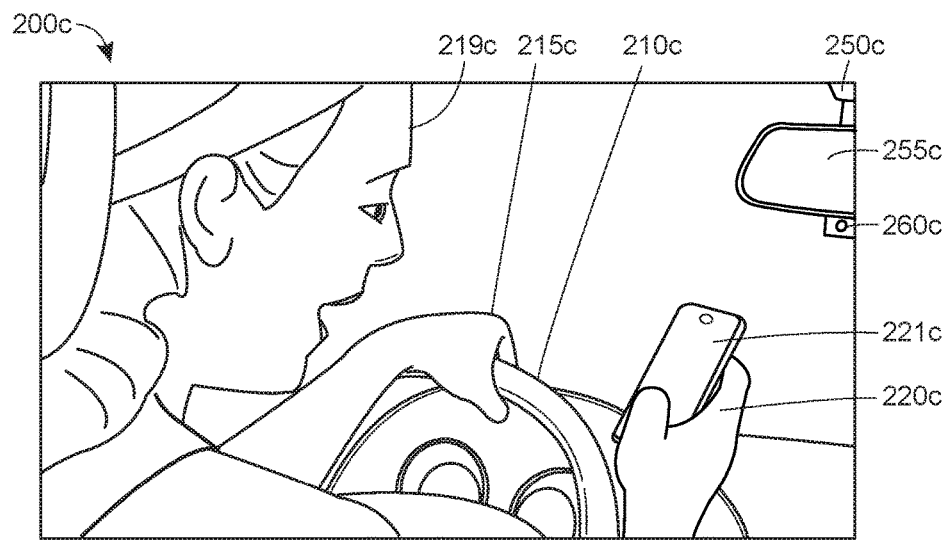

With reference to FIGS. 2A-2C, vehicle interiors 200a, 200b, 200c are depicted. As described in detail herein, data acquired from a vehicle in-cabin device 125a, 135a, 145a, 160a, 180b of FIGS. 1A and 1B (or any other suitably located vehicle in-cabin device) may be used to determine a position of at least a portion of a passenger 297a within the vehicle interior 200a. The data acquired from a vehicle in-cabin device 125a, 135a, 145a, 160a, 180b (or any other suitably located vehicle in-cabin device) may be used to determine whether, or not the passenger 297a is wearing a seatbelt 296a. As further illustrated in FIG. 2A, data acquired from a vehicle in-cabin device 125a, 135a, 145a,

160*a*, 180*b* of FIGS. 1A and 1B (or any other suitably located vehicle in-cabin device) may be used to determine a position and, or orientation of a vehicle driver's head 219*a* and, or right-hand 220*a* on a steering wheel 210*a*. For example, the data acquired from a vehicle in-cabin device 125*a*, 135*a*, 145*a*, 160*a*, 180*b* may be used to determine whether the vehicle driver's head 219*a* is oriented toward a rearview mirror 255*a*, oriented toward the driver-side A-pillar 230*a* or oriented toward the front windshield. The data acquired from the vehicle in-cabin device 125*a*, 135*a*, 145*a*, 160*a*, 180*b* may be used to determine whether the driver is wearing a seatbelt 291*a*. In any event, the vehicle interior 200*a* may include a vehicle in-cabin device having a microphone 250*a* located proximate the rearview mirror 255*a*. As described in detail herein, data acquired from the microphone 250*a* may be used to determine a source of sound within the vehicle interior 200*a* and, or a volume of the sound.

FIG. 2B depicts a vehicle interior 200*b* including a driver-side A-pillar vehicle in-cabin device position 235*b* located on a driver-side A-pillar 230*b*. As described in detail herein, data acquired from the vehicle in-cabin device 235*b* (along with any other suitably located vehicle in-cabin device) may be used to determine a position and, or orientation of a driver's head 219*b*, the driver's left hand 215*b* and, or right hand 220*b* relative to the steering wheel 210*b*. For example, data acquired from the vehicle in-cabin device 235*b* (along with any other suitably located vehicle in-cabin device) may be used to determine a gesture that the driver is performing with her left hand 215*b*.

Turning to FIG. 2C, a vehicle interior 200*b* depicts a vehicle in-cabin device 260*c* located on a bottom side of a rearview mirror 255*c* opposite a rearview mirror mount 250*c*. As described in detail herein, data acquired from the vehicle in-cabin device 260*c* (along with any other suitably located vehicle in-cabin device) may be used to determine a position and, or orientation of a driver's head 219*c*, the driver's left hand 215*c* and, or right hand 220*c* relative to the steering wheel 210*c*. For example, data acquired from the vehicle in-cabin device 260*c* (along with any other suitably located vehicle in-cabin device) may be used to determine that the driver's head 219*c* is oriented toward a cellular telephone 221*c* in her right hand 220*c*. As also described in detail herein, a determination may be made that the driver is inattentive to the road based on the driver's head 219*c* being oriented toward the cellular telephone 221*c*.

Figure 3:
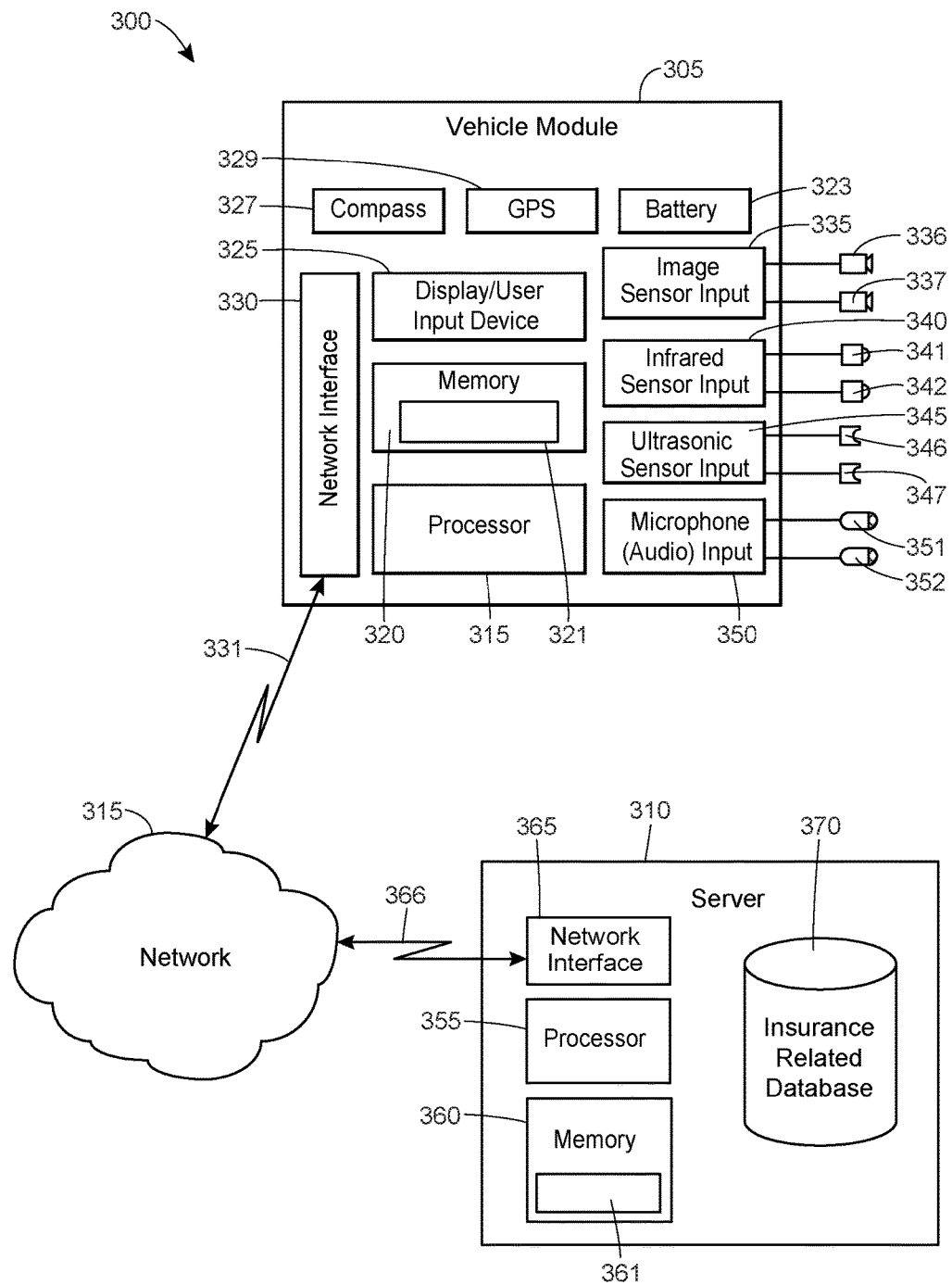
FIG. 3 illustrates a block diagram of a computer network, a computer server and an on-board vehicle computer on which an exemplary vehicle in-cabin device location may be automatically determined within a vehicle interior may operate in accordance with the described embodiments.

With reference to FIG. 3, a high-level block diagram of vehicle in-cabin system 300 is illustrated that may implement communications between a vehicle in-cabin device 305 and a remote computing device 310 (e.g., a remote server) to provide vehicle in-cabin device 305 location and/or orientation data, and vehicle interior occupant position data to, for example, an insurance related database 370. The vehicle in-cabin system 300 may acquire data from a vehicle in-cabin device (e.g., position sensors within a vehicle in-cabin device 125*a*, 135*a*, 145*a*, 160*a*, 180*b* of FIGS. 1A and 1B) and generate three dimensional (3D) models of vehicle interiors and occupants as depicted in FIGS. 2A-2C. The vehicle in-cabin system 300 may also acquire data from a microphone (e.g., microphone 250*a* of FIG. 2A) and determine a source of sound and volume of sound within a vehicle interior.

For clarity, only one vehicle in-cabin device 305 is depicted in FIG. 3. While FIG. 3 depicts only one vehicle in-cabin device 305, it should be understood that any number of vehicle in-cabin devices 305 may be supported. The vehicle in-cabin device 305 may include a memory 320 and a processor 325 for storing and executing, respectively, a module 321. The module 321, stored in the memory 320 as a set of computer-readable instructions, may be related to a vehicle interior and occupant position data collecting application that, when executed on the processor 325, causes vehicle in-cabin device location data to be stored in the memory 320. Execution of the module 321 may also cause the processor 325 to generate at least one 3D model of at least a portion of a vehicle occupant (e.g., a driver and/or passenger) within the vehicle interior. Execution of the module 321 may further cause the processor 325 to associate the vehicle in-cabin device location data with a time and, or date. Execution of the module 321 may further cause the processor 325 to communicate with the processor 355 of the remote computing device 310 via the network interface 330, the vehicle in-cabin device communications network connection 331 and the wireless communication network 315.

The vehicle in-cabin device 305 may also include a compass sensor 327, a global positioning system (GPS) sensor 329, and a battery 323. The vehicle in-cabin device 305 may further include an image sensor input 335 communicatively connected to, for example, a first image sensor 336 and a second image sensor 337. While two image sensors 336, 337 are depicted in FIG. 3, any number of image sensors may be included within a vehicle interior monitoring system and may be located within a vehicle interior as depicted in FIGS. 1A-1C. The vehicle in-cabin device 305 may also include an infrared sensor input 340 communicatively connected to a first infrared sensor 341 and a second infrared sensor 342. While two infrared sensors 341, 342 are depicted in FIG. 3, any number of infrared sensors may be included within a vehicle interior monitoring system and may be located within a vehicle interior as depicted in FIGS. 1A-1C. The vehicle in-cabin device 305 may further include an ultrasonic sensor input 345 communicatively connected to a first ultrasonic sensor 346 and a second ultrasonic sensor 347. While two ultrasonic sensors 346, 347 are depicted in FIG. 3, any number of ultrasonic sensors may be included within a vehicle interior monitoring system and may be located within a vehicle interior as depicted in FIGS. 1A-1C. The vehicle in-cabin device 305 may also include a microphone input 350 communicatively connected to a first microphone 351 and a second microphone 352. While two microphones 351, 352 are depicted in FIG. 3, any number of microphones may be included within a vehicle interior monitoring system and may be located within a vehicle interior as depicted in FIGS. 1A-1C. The vehicle in-cabin device 305 may further include a display/user input device 325.

As one example, a first image sensor 336 may be located in a driver-side A-pillar (e.g., location of position sensor 135*a* of FIG. 1A), a second image sensor 337 may be located in a passenger-side A-pillar (e.g., location of position sensor 145*a* of FIG. 1A), a first infrared sensor 341 may be located in a driver-side B-pillar (e.g., location of position sensor 180*b* of FIG. 1B), a second infrared sensor 342 may be located in a passenger-side B-pillar (not shown in the Figs.), first and second ultrasonic sensors 346, 347 may be located in a center portion of a vehicle dash (e.g., location of position sensor 125*a* of FIG. 1A) and first and second microphones 351, 352 may be located on a bottom portion of a vehicle interior rearview mirror (e.g., location of position sensor 160*a* of FIG. 1A). The processor 315 may acquire position data from any one of, or all of, these sensors 336, 337, 341, 342, 346, 347, 351, 352 and generate at least one 3D model (e.g., a 3D model of at least a portion of a vehicle driver) based on the position data. The processor 315 may transmit data representative of at least one 3D model to the remote computing device 310. Alternatively, the processor 315 may transmit the position data to the remote computing device 310 and the processor 355 may generate at least one 3D model based on the position data. In either event, the processor 315 or the processor 355 may retrieve data representative of a 3D model of a vehicle operator, and may compare at least a portion of the data representative of the 3D model of vehicle driver with data representative of at least a portion of the 3D model vehicle operator. The processor 315 and, or the processor 355 may generate a vehicle driver warning based on the comparison of the data representative of the 3D model of at least a portion of the vehicle driver with data representative of at least a portion of the 3D model vehicle operator to warn the vehicle operator that his position is indicative of inattentiveness. Alternatively, the processor 315 and/or the processor 355 may generate an advisory based on the comparison of the data representative of the 3D model of at least a portion of the vehicle driver with data representative of at least a portion of the 3D model of a vehicle operator to advise the vehicle operator how to correct her position to improve attentiveness.

The network interface 330 may be configured to facilitate communications between the vehicle in-cabin device 305 and the remote computing device 310 via any hardwired or wireless communication network 315, including for example a wireless LAN, MAN or WAN, WiFi, the Internet, or any combination thereof. Moreover, the vehicle in-cabin device 305 may be communicatively connected to the remote computing device 310 via any suitable communication system, such as via any publicly available or privately owned communication network, including those that use wireless communication structures, such as wireless communication networks, including for example, wireless LANs and WANs, satellite and cellular telephone communication systems, etc. The vehicle in-cabin device 305 may cause insurance risk related data to be stored in a remote computing device 310 memory 360 and/or a remote insurance related database 370.

The remote computing device 310 may include a memory 360 and a processor 355 for storing and executing, respectively, a module 361. The module 361, stored in the memory 360 as a set of computer-readable instructions, facilitates applications related to determining a vehicle in-cabin device location and/or collecting insurance risk related data. The module 361 may also facilitate communications between the computing device 310 and the vehicle in-cabin device 305 via a network interface 365, a remote computing device network connection 366 and the network 315 and other functions and instructions.

The computing device 310 may be communicatively coupled to an insurance related database 370. While the insurance related database 370 is shown in FIG. 3 as being communicatively coupled to the remote computing device 310, it should be understood that the insurance related database 370 may be located within separate remote servers (or any other suitable computing devices) communicatively coupled to the remote computing device 310. Optionally, portions of insurance related database 370 may be associated with memory modules that are separate from one another, such as a memory 320 of the vehicle in-cabin device 305.

Figure 4:
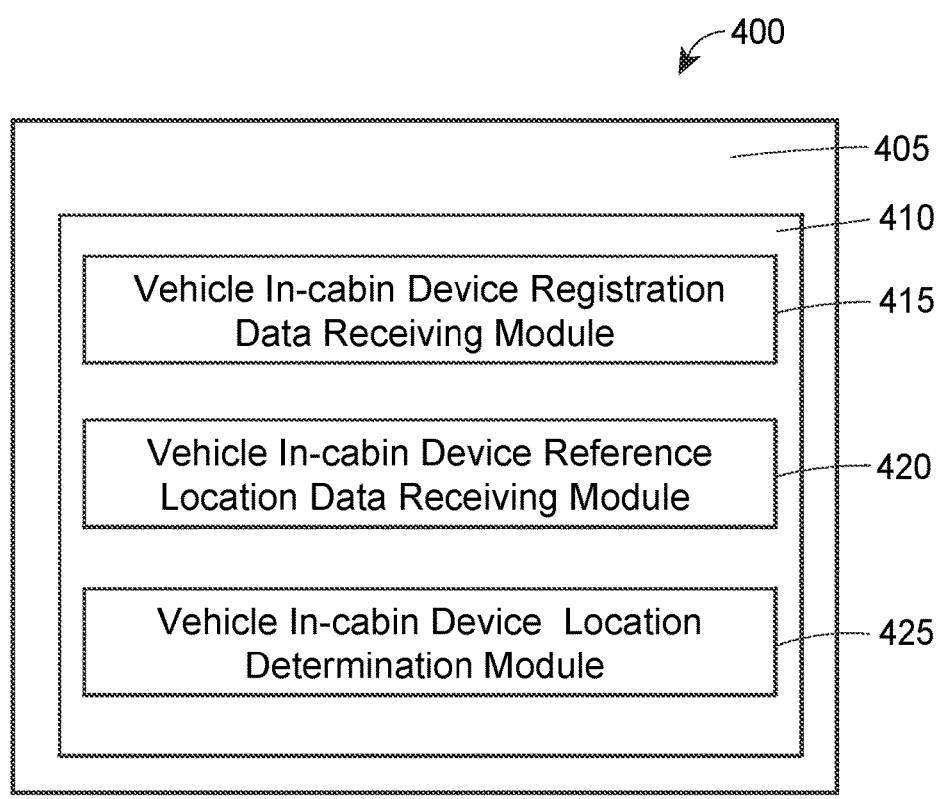
FIG. 4 illustrates a block diagram of an exemplary vehicle in-cabin device for use in automatically determining a location of the vehicle in-cabin device within a vehicle interior.
Figure 5:
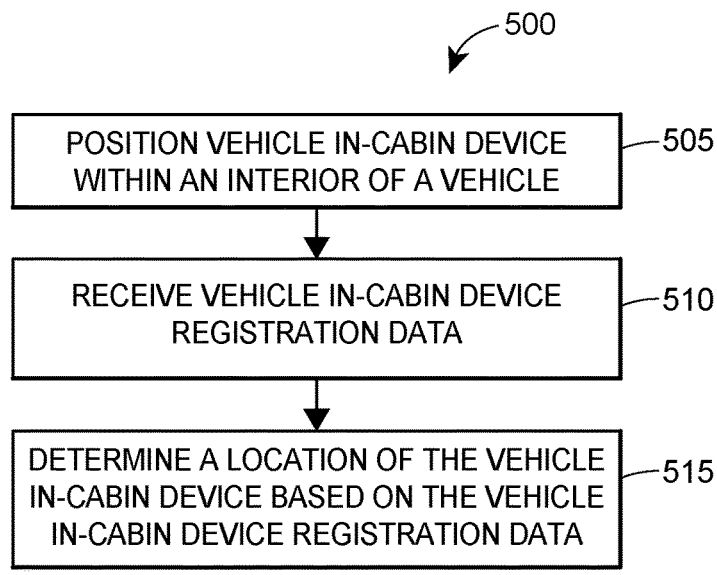
FIG. 5 depicts a flow diagram of an example method of automatically determining a vehicle in-cabin device location within a vehicle interior.
Figure 6:
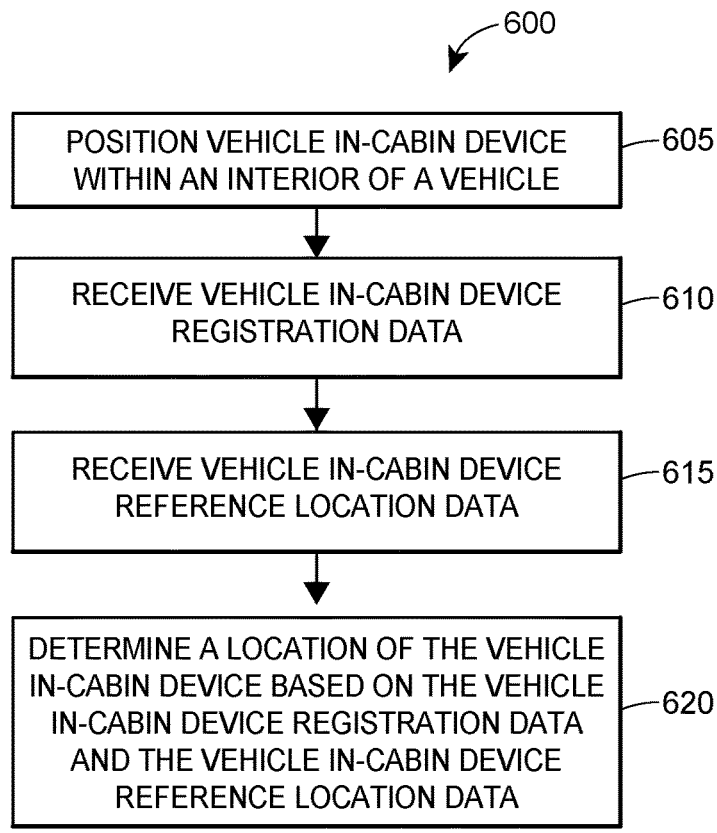
FIG. 6 depicts a flow diagram of an example method of automatically determining a vehicle in-cabin device location within a vehicle interior.

Turning to FIGS. 4, 5 and 6, a vehicle in-cabin device 405 of a vehicle in-cabin device data collection system 400 is depicted along with methods 500, 600 of automatically determining a location and/or orientation of a vehicle in-cabin device 405 and, or transmitting related data to a remote server 310. The vehicle in-cabin device 405 may be similar to the vehicle in-cabin device with insurance application 305 of FIG. 3. The methods 500, 600 may be implemented by executing the modules 415-425 on a processor (e.g., processor 315).

In any event, the vehicle in-cabin device 405 may include a vehicle in-cabin device registration data receiving module 415, a vehicle in-cabin device reference location data receiving module 420, and a vehicle in-cabin location determination module 425 stored in a memory 420. The modules 415-425 may be stored in the memory 420 as a set of computer-readable instructions that, when executed by the processor 315, may cause the processor 315 to automatically determine a vehicle in-cabin device 405 location and/or orientation relative to an interior of a vehicle.

The vehicle in-cabin device 405 may be positioned within an interior of a vehicle (block 505). The processor 315 may execute the vehicle in-cabin device registration data receiving module 415 to, for example, cause the processor 315 to receive vehicle in-cabin device registration data (block 510). The processor 315 may receive vehicle in-cabin device registration data from, for example, at least one of a compass sensor 327, a GPS sensor 329, an image sensor 336, 337, an infrared sensor 341, 342, an ultrasonic sensor 346, 347, and/or a microphone 351, 352. The vehicle in-cabin device registration data may be representative of images, and/or features (e.g., a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, a vehicle seat location/orientation, etc.) extracted from images, of an interior of a vehicle.

The processor 315 may execute the vehicle in-cabin device location determination module 425 to, for example, cause the processor 315 to automatically determine a vehicle in-cabin device 405 location within an interior of a vehicle (block 515). For example, the processor 315 may automatically determine a vehicle in-cabin device 405 location and/or orientation based on the vehicle in-cabin device registration data. As a particular example, the processor 315 may determine a vehicle in-cabin device location and/or orientation based on data received from at least one of: a global positioning system (GPS) sensor, an accelerometer, or a gyroscope. Alternatively, or additionally, the processor 315 may determine an in-cabin device location and/or orientation by analyzing image data for key landmarks, such as, for example, a car seat to determine whether an image is right-side up, or upside down (e.g., if a bottom of a car seat starts at a top portion of an image and a top of the car seat extends downward within the image, the processor 315 may determine the vehicle in-cabin device is upside down).

Based on the determined location and/or orientation, the processor 315, further executing the vehicle in-cabin device location determination module 425, may adjust associated image such that real-time image data may be correlated with previously classified image data. As a particular example, a vehicle in-cabin device may be located and oriented such that an associated sensor is 2 cm towards a driver from a passenger-side A-pillar, 5 cm above a dashboard, and upside down (i.e., 180 degree rotation about the Z-axis). Thereby, the apparatuses, systems and methods of the present disclosure may adjust current image data right-side up and may compare the adjusted image data to previously classified image data.

Turning to FIG. 6, a vehicle in-cabin device 405 may be positioned within an interior of a vehicle (block 605). The processor 315 may execute the vehicle in-cabin device registration data receiving module 415 to, for example, cause the processor 315 to receive vehicle in-cabin device registration data (block 610). The processor 315 may receive vehicle in-cabin device registration data from, for example, at least one of a compass sensor 327, a GPS sensor 329, an image sensor 336, 337, an infrared sensor 341, 342, an ultrasonic sensor 346, 347, and/or a microphone 351, 352. The vehicle in-cabin device registration data may be representative of images, and/or features (e.g., a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, a vehicle seat location/orientation etc.) extracted from images, of an interior of a vehicle.

The processor 315 may execute the vehicle in-cabin device reference location data receiving module 420 to, for example, cause the processor 315 to receive vehicle in-cabin device reference location data (block 615). The vehicle in-cabin device reference location data may be representative of, for example, known locations and/or orientations of vehicle in-cabin devices within a respective interior of a vehicle. The vehicle in-cabin device reference location data may be representative of images, and/or features (e.g., a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, a vehicle seat location/orientation, etc.) extracted from images, of an interior of an associated vehicle. The processor 315 may receive the vehicle in-cabin device reference location data from, for example, an insurance related database 370 via a remote computing device 310.

The processor 315 may execute the vehicle in-cabin location determination module 425 to, for example, cause the processor 315 to automatically determine a vehicle in-cabin device 405 location and/or orientation within an interior of a vehicle (block 620). For example, the processor 315 may automatically determine a vehicle in-cabin device 405 location based on the vehicle in-cabin device registration data and the vehicle in-cabin device reference location data. For example, the processor 315 may compare the vehicle in-cabin device registration data (e.g., images and/or features extracted from the images) with the vehicle in-cabin device reference location data (e.g., images and/or features extracted from the images) to automatically determine a vehicle in-cabin device location and/or orientation.

A car-sharing insurance product could more specifically insure the driver, regardless of the car. Traditional underwriting looks at the driver-vehicle combination. For example, an insurance company weight the risk of the driver more heavily than any particular car. The methods and systems of the present disclosure may allow car-sharing to get that risk information on the driver and carry it forward to whatever car they use. This would be tailored for that particular driver's behavior, rather than demographic and vehicle-use factors. This may allow certain car-sharing entities to have a cost advantage. If the car-sharing entities are paying less, or more for specific insurance, the car-sharing entities could pass those savings/costs to their customers and have a retention strategy.

The methods and systems of the present disclosure may allow for emergency responders by, for example, using gesture recognition systems from an aftermarket/insurance device in order to provide an estimate to first responders about the severity of the crash and what kinds of resources/equipment/expertise is required in order to extricate. Using the gesture recognition systems from an aftermarket/insurance device in order to provide an estimate to first responders about the severity of the crash and what kinds of resources/equipment/expertise is required in order to triage—have some idea of what emergency medical needs could be upon arrival. Since the "golden hour" is so critical, and it's not always known how much of that hour has already expired, even a preliminary or broad clue could be helpful in the triage process. The aftermarket gesture recognition device is already operating at the time of the crash. It is collecting data about the driver's position/posture and the location of the arms relative to the body and structures in the vehicle (i.e. the steering wheel). Accelerometers in the device are able to recognize that a crash has occurred (if a pre-determined acceleration threshold has been reached). Upon crash detection the device could transmit via the driver's phone (which is already connected via Bluetooth) or perhaps transmit using an onboard transmitter that uses emergency frequencies (and therefore does not require consumer to pay for data fees). Using gesture recognition from any original equipment or aftermarket gesture tracking device, whether or not for insurance purposes.

The methods and systems of the present disclosure may allow for Transition from Automated to Manual Driving Mode in the case of vehicle automation systems operating the piloting functions with the human in a supervisory role. For example, the vehicle may encounter a situation where control needs to be transferred to the driver, but the driver may or may not be ready to resume control. The methods and systems of the present disclosure may allow gesture recognition systems, or any gesture recognition system, to be used to determine if the driver is ready to resume control. If he/she is not ready, then get his/her attention quickly. The gesture recognition would be used to ascertain whether the driver is ready to resume control by evaluating the driver's posture, the location of hands, the orientation of head, body language. Use machine learning to evaluate driver engagement/attention/readiness-to-engage based on those variables. The gesture recognition could be any original in-vehicle equipment or aftermarket device.

The methods and systems of the present disclosure may distinguish between Automated and Manual driving modalities for variable insurance rating for a scenario where there are many vehicles that are capable of automatically operating the piloting functions, and are capable of the driver manually operating the piloting functions. The driver can elect to switch between automated and manual driving modes at any point during a drive. Gesture recognition would be utilized to distinguish whether a driver is operating the vehicle manually, or whether the vehicle is operating automatically. This could be determined through either OEM or aftermarket hardware. The sensors and software algorithms are able to differentiate between automatic and manual driving based on hand movements, head movements, body posture, eye movements. It can distinguish between the driver making hand contact with the steering wheel (to show that he/she is supervising) while acting as a supervisor, versus the driver providing steering input for piloting purposes. Depending on who/what is operating the vehicle would determine what real-time insurance rates the customer is charged.

The methods and systems of the present disclosure may provide a tool for measuring driver distraction where gesture recognition may be used to identify, distinguish and quantify driver distracted for safety evaluation of vehicle automation systems. This would be used to define metrics and evaluate safety risk for the vehicle human-machine interface as a whole, or individual systems in the case where vehicles have automation and vehicle-to-vehicle/vehicle-to-infrastructure communication capabilities. With Vehicle automation: the vehicle is capable of performing piloting functions without driver input. With Vehicle-to-vehicle/vehicle-to-infrastructure communication incorporated, the vehicle may be capable of communicating data about the first vehicle dynamics or environmental traffic/weather conditions around the first vehicle. For any entity looking to evaluate the safety or risk presented by a vehicle with automated driving capabilities, gesture recognition could be useful to quantify risk presented by driver distraction resulting from any vehicle system in the cabin (i.e. an entertainment system, a feature that automates one or more functions of piloting, a convenience system). With the rise of vehicle automation systems and capabilities, tools will be needed to evaluate the safety of individual systems in the car, or the car as a whole. Much uncertainty remains about how these systems will be used by drivers (especially those who are not from the community of automotive engineering or automotive safety). Determining whether they create a net benefit to drivers is a big question. The methods and systems of the present disclosure may allow gesture recognition to be used to identify the presence of distracted driving behaviors that are correlated with the presence of vehicle automation capabilities. The distracted driver could be quantified by duration that the driver engages in certain behaviors. Risk quantification may also be measured by weighting certain behaviors with higher severity than other behaviors, so the duration times are weighted. Risk quantification may also differentiate subcategories of behaviors based on degree of motion of hands, head, eyes, body. For example, the methods and systems of the present disclosure may distinguish texting with the phone on the steering wheel from texting with the phone in the driver's lap requiring frequent glances up and down. The latter would be quantified with greater risk in terms of severity of distraction. The purpose of this risk evaluation could be for reasons including but not limited to adhering to vehicle regulations, providing information to the general public, vehicle design testing or insurance purposes.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A vehicle in-cabin device for generating data representative of at least one skeletal diagram of at least one occupant within an associated vehicle, the vehicle in-cabin device comprising:
   a processor and a memory;
   at least one sensor for generating vehicle interior data, wherein the vehicle interior data is representative of a location of the vehicle in-cabin device within the vehicle;
   a vehicle in-cabin device location determination module stored on the memory that, when executed by the processor, causes the processor to generate vehicle in-cabin device location data based on the vehicle interior data, wherein the vehicle in-cabin device location data is representative of a location and orientation of the vehicle in-cabin device within the vehicle interior; and
   an adjustment algorithm stored on the memory that, when executed by the processor, causes the processor to adjust real-time images based on the vehicle in-cabin device location data such that the real-time images are correlated with previously classified image data.

2. The vehicle in-cabin device as in claim 1, wherein the at least one sensor is selected from: at least one digital image sensor, at least one ultra-sonic sensor, at least one radar-sensor, at least one infrared light sensor, or at least one laser light sensor.

3. The vehicle in-cabin vehicle device as in claim 1, wherein the vehicle interior data is representative of a three-dimensional location of the vehicle in-cabin device within the vehicle interior.

4. The vehicle in-cabin vehicle device as in claim 1, wherein the vehicle interior data is representative of an orientation of the vehicle in-cabin device selected from: a vehicle in-cabin device tilt value, a vehicle in-cabin device pan value, or a vehicle in-cabin device roll value.

5. The vehicle in-cabin device as in claim 1, wherein the vehicle interior data is representative of a three-dimensional location of the vehicle in-cabin device within the vehicle interior and an orientation of the vehicle in-cabin device selected from: a vehicle in-cabin device tilt value, a vehicle in-cabin device pan value, or a vehicle in-cabin device roll value.

6. The vehicle in-cabin device as in claim 1, further comprising:
   a compass for generating compass data, wherein the compass data is representative of an orientation of the vehicle in-cabin device within the vehicle interior.

7. The vehicle in-cabin device as in claim 1, wherein the at least one sensor includes a first digital image sensor and a second digital image sensor, and the vehicle interior data is representative of a three-dimensional location of the vehicle in-cabin device within the vehicle interior.

8. A computer-implemented method for automatically registering a location of a vehicle in-cabin device within an interior of a vehicle, the method comprising:
   positioning the vehicle in-cabin device within the interior of the vehicle;
   receiving, at a processor of a computing device, vehicle in-cabin device registration location data from a sensor of the vehicle in-cabin device, wherein the vehicle in-cabin device registration location data is representative of at least one of: a two-dimensional location of the vehicle in-cabin device within the vehicle or a three-dimensional location of the vehicle in-cabin device within the vehicle and at least one of: a vehicle in-cabin device tilt value, a vehicle in-cabin device pan value, or a vehicle in-cabin device roll value; and
   adjusting real-time images based on the vehicle in-cabin device registration location data such that the real-time images are correlated with previously classified image data.

9. The method of claim 8, further comprising:
   receiving, at the processor of the computing device, vehicle in-cabin device reference data, wherein the vehicle in-cabin device reference data is representative of known vehicle in-cabin device locations and orientations.

10. The method of claim 9, further comprising:
comparing, using the processor of the computing device, the vehicle in-cabin device registration location data and the vehicle in-cabin device reference data.

11. The method of claim 8, further comprising:
receiving, at a processor of the computing device, vehicle in-cabin device reference image data, wherein the vehicle in-cabin device reference data is representative of known vehicle in-cabin device locations and orientations.

12. The method of claim 8, further comprising:
extracting features from vehicle in-cabin device reference data, wherein the features are representative of items within the vehicle.

13. The method of claim 12, wherein the vehicle in-cabin device registration location data is based on the features.

14. A non-transitory computer-readable medium storing computer-readable instruction that, when executed by a processor, cause the processor to automatically register a location of a vehicle in-cabin device within an interior of a vehicle, the non-transitory computer-readable medium comprising:
a vehicle in-cabin device registration location data receiving module that, when executed by the processor, causes the processor to receive vehicle in-cabin device registration location data from a sensor of the vehicle in-cabin device, wherein the vehicle in-cabin device registration location data is representative of at least one of: a two-dimensional location of the vehicle in-cabin device within the vehicle or a three-dimensional location of the vehicle in-cabin device within the vehicle and at least one of: a vehicle in-cabin device tilt value, a vehicle in-cabin device pan value, or a vehicle in-cabin device roll value; and
an adjustment algorithm that, when executed by the processor, causes the processor to adjust real-time images based on the vehicle in-cabin device registration location data such that the real-time images are correlated with previously classified image data.

15. The non-transitory computer-readable medium of claim 14, further comprising:
a vehicle in-cabin device reference data receiving module that, when executed by a processor, causes the processor to receive vehicle in-cabin device reference data, wherein the vehicle in-cabin device reference data is representative of known vehicle in-cabin device locations and orientations.

16. The non-transitory computer-readable medium of claim 15, further comprising:
a comparing module that, when executed by a processor, causes the processor to compare the vehicle in-cabin device registration location data and the vehicle in-cabin device reference data.

17. The non-transitory computer-readable medium of claim 14, further comprising:
a vehicle in-cabin device reference image data receiving module that, when executed by the processor, causes the processor to receive vehicle in-cabin device reference image data, wherein the vehicle in-cabin device reference data is representative of known vehicle in-cabin device locations and orientations.

18. The non-transitory computer-readable medium of claim 14, further comprising:
a feature extracting module that, when executed by the processor, causes the processor to extract features from vehicle in-cabin device reference data, wherein the features are representative of items within the vehicle.

19. The non-transitory computer-readable medium of claim 18, wherein the vehicle in-cabin device registration location data is based on the features.

20. The non-transitory computer-readable medium of claim 19, wherein the vehicle in-cabin device reference image data is representative of known features.

\* \* \* \* \*